United States Patent [19]
Cottrell

[11] 4,146,123
[45] Mar. 27, 1979

[54] STICK ALIGNING AND CONVEYING METHOD AND APPARATUS

[75] Inventor: Edward D. Cottrell, Cattaraugus, N.Y.

[73] Assignee: Champion International Corporation, Stamford, Conn.

[21] Appl. No.: 819,829

[22] Filed: Jul. 28, 1977

[51] Int. Cl.² .............................................. B65G 47/14
[52] U.S. Cl. .................... 198/382; 198/534; 198/560; 198/758; 198/771; 221/156
[58] Field of Search ............. 198/382, 396, 445–448, 198/533, 560, 609, 452, 532, 534; 221/156, 200, 204; 198/633, 758, 771, 383, 601, 750

[56] References Cited
U.S. PATENT DOCUMENTS

| 952,512 | 3/1910 | Clinton | 198/382 |
|---|---|---|---|
| 1,551,614 | 9/1925 | Paridon | 198/452 |
| 1,925,990 | 9/1933 | Pampel | 198/532 |
| 2,164,676 | 7/1939 | Appleyard et al. | 198/771 |
| 2,186,652 | 1/1940 | Orth et al. | 198/396 |
| 2,324,246 | 7/1943 | Thompson et al. | 198/446 |
| 3,572,492 | 3/1971 | Dreszig | 198/446 |
| 3,581,870 | 6/1971 | Best | 198/533 |
| 3,837,469 | 9/1974 | Kihnke | 198/382 |

FOREIGN PATENT DOCUMENTS

| 656919 | 10/1963 | Italy | 198/560 |
|---|---|---|---|
| 248635 | 2/1948 | Switzerland | 221/200 |

Primary Examiner—Joseph E. Valenza
Attorney, Agent, or Firm—Evelyn M. Sommer

[57] ABSTRACT

A method of aligning sticks in which the sticks are oscillated in a receiving zone where they are aligned and conveyed to a collecting zone where they are stacked in parallel side-by-side relationship. The collecting zone is vibrated to dispense the sticks laterally, still in parallel alignment. An aligning tray has two sets of parallel, elongated channels and is reciprocated vertically and in a direction parallel with the channels. Randomly oriented sticks are fed to the first set, aligned in the channels, fed to the second set, which has half as many channels, and then fed through sloping chutes to a set of hoppers. The hopppers and chutes are vibrated vertically and receive the sticks in parallel stacks. The vibrating motion causes the sticks to leave the hoppers laterally and roll down ramps to a non-vibrating conveyor belt which translates the sticks in a direction perpendicular to the long dimension of the sticks to a receiving location.

9 Claims, 10 Drawing Figures

STICK ALIGNING AND CONVEYING METHOD AND APPARATUS

This invention relates to a method and apparatus for handling elongated articles such as sticks and, in particular, to apparatus for orienting and delivering sticks for further handling.

BACKGROUND OF THE INVENTION

While the present invention has utility in handling elongated articles of various kinds, it finds particular utility in the handling of wrapped paper sticks of the type used in making lollipops and will therefore be discussed in that context.

Sticks of the type under consideration are made by known processes, which do not form a part of this invention, in which elongated webs of paper are tightly wound into a spiral elongated configuration and then cut to form sticks which are several inches long and approximately ⅛" in diameter. As a final step in the production of these sticks, the outer surfaces thereof are coated with wax and are then polished. The sticks must then be handled for inspection and packing, or for delivery to further production equipment for the production of the lollipops.

Because the sticks are produced at a high rate, it has been found necessary to provide apparatus which is capable of accepting batches, or a substantially continuous supply, of randomly oriented sticks for the purpose of arranging or orienting them so that they all lie in the same direction. The sticks must then be presented so that they can conveniently, quickly and efficiently be inspected and packed into suitable containers.

While the prior art includes numerous devices which are designed to orient and transport articles of various kinds, such devices are not adaptable to articles of the type under consideration.

BRIEF DESCRIPTION OF THE INVENTION

Briefly described, an apparatus in accordance with the invention for receiving randomly oriented elongated articles and for aligning said articles parallel with each other in a predetermined direction includes means for receiving a plurality of randomly oriented articles, means for imparting repetitive motion to said means for receiving to align said articles and to convey said articles in said predetermined direction along and out of said means for receiving, collecting means for collecting articles conveyed out of said means for receiving in substantially parallel side-by-side relationship, and means for imparting repetitive motion to said collecting means in a direction different from said predetermined direction to dispense said articles laterally from said collecting means while maintaining their parallel alignment.

A method in accordance with the invention for aligning randomly oriented elongated articles with each other in a predetermined direction includes the steps of passing a plurality of randomly oriented articles into a first collection zone, imparting repetitive motion to said articles to cause alignment thereof and to convey said articles to a second collection zone, collecting said articles in said second zone in substantially parallel side-by-side relationship, and imparting repetitive motion to the articles in said second zone in a direction different from the motion imparted thereto in said first zone to dispense the articles laterally from said second zone while maintaining their parallel alignment.

In order that the manner in which the objects of the invention are attained can be understood in detail, particularly advantageous embodiments thereof will be described with reference to the accompanying drawings, which form a part of this specification, and wherein.

Figure 1:
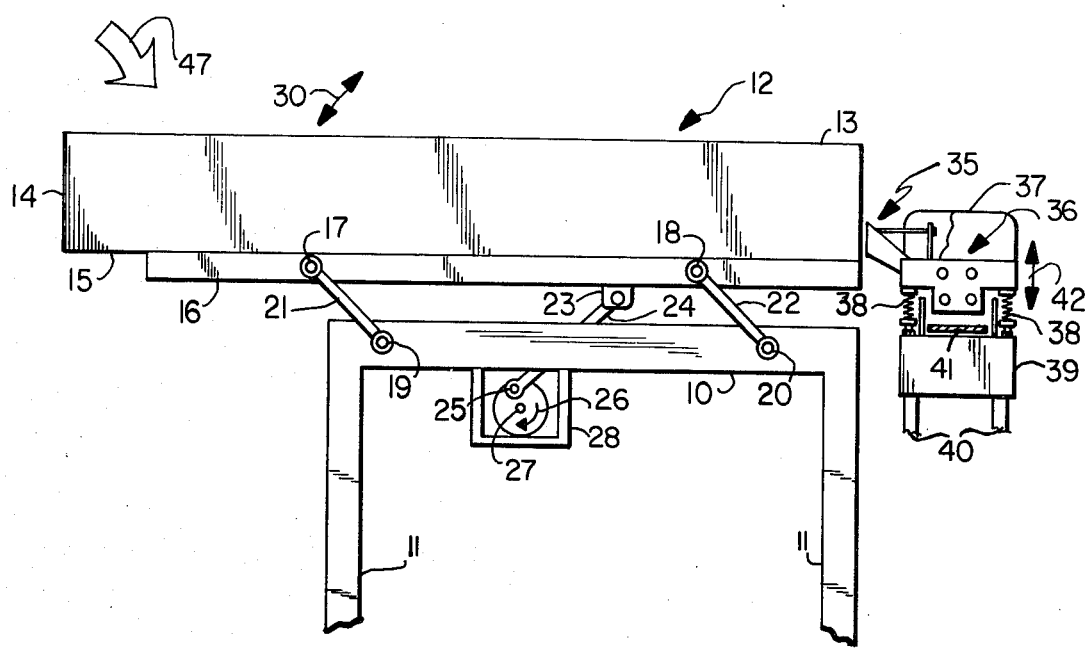
FIG. 1 is a side elevation of an apparatus in accordance with the invention.

Referring first to FIG. 1, it will be seen that the overall apparatus includes a base frame having horizontal support members 10 and legs 11, the frame being of rigid and strong construction such as welded steel channel. An aligning tray structure indicated generally at 12 includes upstanding side walls 13, a back end wall 14 and a bottom wall 15. The bottom wall rests on and is fixedly attached to a rectangular frame 16 which is provided with stub axles 17 and 18 protruding outwardly from opposite sides thereof. Horizontal portion 10 of the frame is also provided with stub axles 19 and 20 which are parallel with axles 17 and 18. Link members 21 and 22 extend between axles 17 and 19 and axles 18 and 20, respectively, on both sides of the structure and are provided with enlarged end journal portions which surround their respective axles so that the link members are freely pivotable relative to the axles which they engage. A bracket member 23 is fixedly attached to and extends downwardly from frame 16 and has an opening to receive one end of a crank arm 24, the other end of the crank arm being pivotally connected to an eccentric pin 25 on a drive wheel 26. Wheel 26 is mounted on or coupled to the drive shaft 27 of a motor, not shown, which can be mounted on a U-shaped frame 28 depending from frame 10. The motor can also be mounted on the floor and coupled to wheel 26 by a conventional belt and pulley drive.

As will be recognized from this description, when the motor is energized to drive wheel 26, crank arm 24 will cause frame 16 and the aligning tray supported thereon to be repetitively reciprocated in a direction indicated by double-headed arrow 30, the tray being supported and aligned by links 21 and 22 and their counterpart links on the opposite side of frame 16. Thus, the reciprocatory motion has a longitudinal component in the plane of the drawing and also a vertical component of motion. The motor and wheel 26 can be operated at a speed of, for example, 150 rpm to cause the tray to reciprocate at 150 cycles per minute through a stroke of about ½ inch (1.3 cm.).

As previously indicated, one end of the tray structure described above is closed by wall 14 and the other end thereof is open and faces a structure which includes a plurality of tapered chutes indicated generally at 35 leading into a hopper assembly indicated generally at 36. The hopper assembly is provided with an electromagnetic vibratory mechanism 37 at each end and is supported on coil springs 38, the springs being mounted on a fixed frame 39 which has legs 40 by which it is supported on a floor. Beneath the vibrating hopper assembly is a conveyor belt 41, which carries sticks dispensed from the hopper assemblies away from the hoppers, the remote end of the belt constituting a receiving location.

The hopper assembly 36, which will also be described in greater detail, is given relatively low amplitude vibratory vertical motion as indicated by a double-headed arrow 42, the vibrator unit 37 itself being a commercially available unit. Because of the fact that the hopper assembly is freely suspended on springs 38, it is free to move in the vertical direction. The amplitude of the vibratory motion can be, for example, between about 0.040 and 0.050 inches (1.0 and 1.3 mm.) at a rate of 3,600 cycles per minute.

Figure 2:
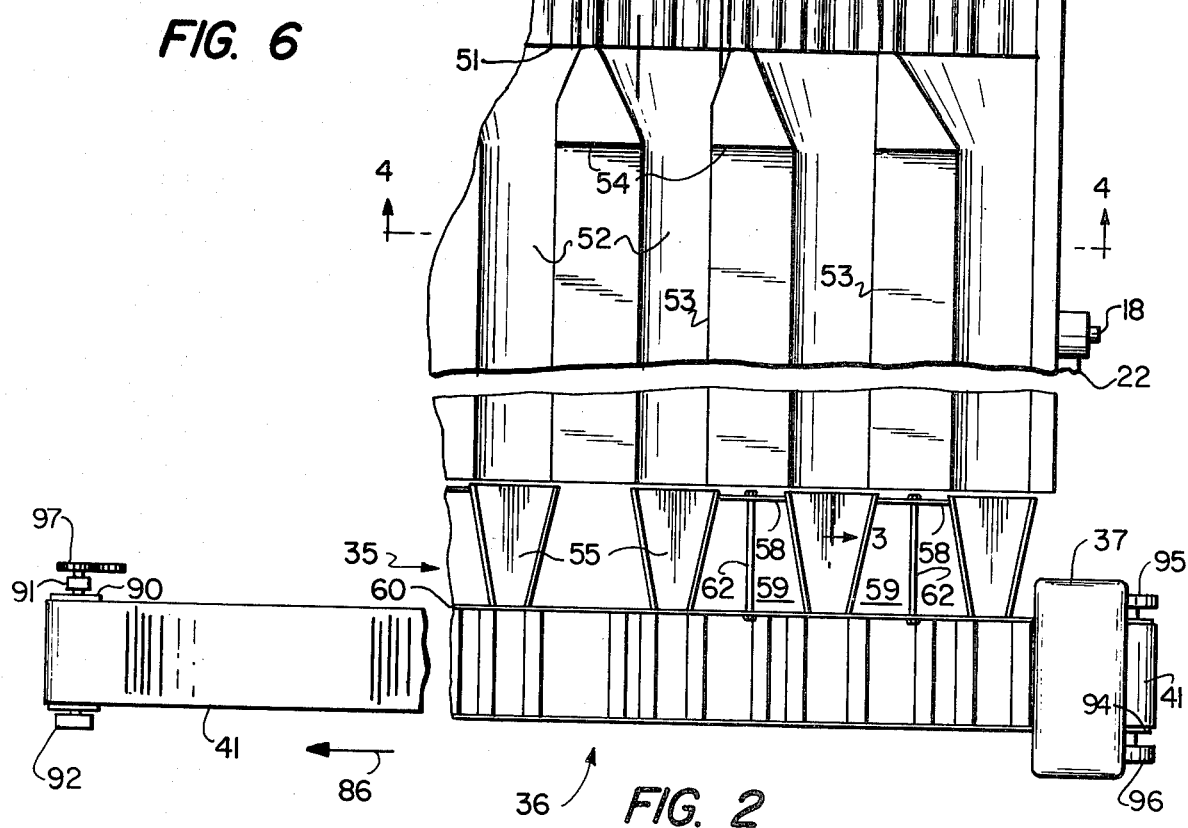
FIG. 2 is a partial foreshortened plan view of the apparatus of FIG. 1.

A plan view of tray assembly 12 is shown in FIG. 2. From this figure, in conjunction with the sectional views in FIGS. 3 and 4, it will be seen that the tray includes an upper, rear portion, the upper surface of which is convoluted to form a plurality of channels 45 and intervening ridges 46, that portion of the channeled upper portion closest to end wall 14 being the area which receives batches or a continuous stream of sticks which are to be aligned and conveyed. As schematically illustrated in FIG. 2, the sticks 48 are dispensed onto the upper surface of this portion in random fashion with some of the sticks falling into the channels 45 and others lying crosswise, in various orientations, on the ridged portions thereof. Only a few of the sticks are shown in the figures, but it will be recognized that a large number of these can be dispensed onto this surface. As the motor and crank arm assembly causes the table to reciprocate, the sticks are gradually caused to rotate and fall into channels 45 and, primarily because of the longitudinal component of motion of the tray assembly, are gradually caused to move in the direction of arrow 50 toward wall 51 which defines the end of this upper channel portion. Typically, this upper tray portion includes twelve parallel channels with intervening ridges.

Figure 4:
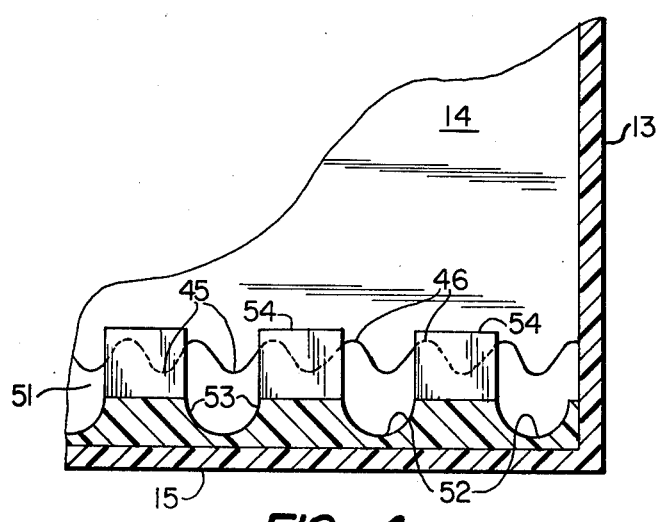
FIG. 4 is a partial front elevation, in partial section, along lines 4—4 of FIG. 2.

As the sticks reach wall 51, they are caused to fall into a second channeled portion including channels 52 with intervening elongated barriers 53, channels 52, as seen in FIG. 4, having rounded bottom portions and substantially vertical side walls. It will be observed that there are twice as many channels 45 as there are channels 52, channels 52 being wider and lower than channels 45, but the width of channels 52 is smaller than the length of the sticks and is rounded at the bottom to cause the sticks to tend to lie in the bottom thereof and maintain the orientation originally arrived at in channels 45.

Adjacent the interface between the two sets of channels, channels 52 widen and are rounded and the guiding of sticks between one set of channels and the other is assisted by upwardly extending guide blocks 54 which are generally triangular in plan, but, more significantly, have tapered surfaces so that pairs of channels 45 feed into channels 52. As a result of the same movement of the tray, the sticks progress along channel 52 in the direction of arrow 50 until they ultimately are dispensed from the open ends of the channels toward chute assemblies 35.

Figure 3:
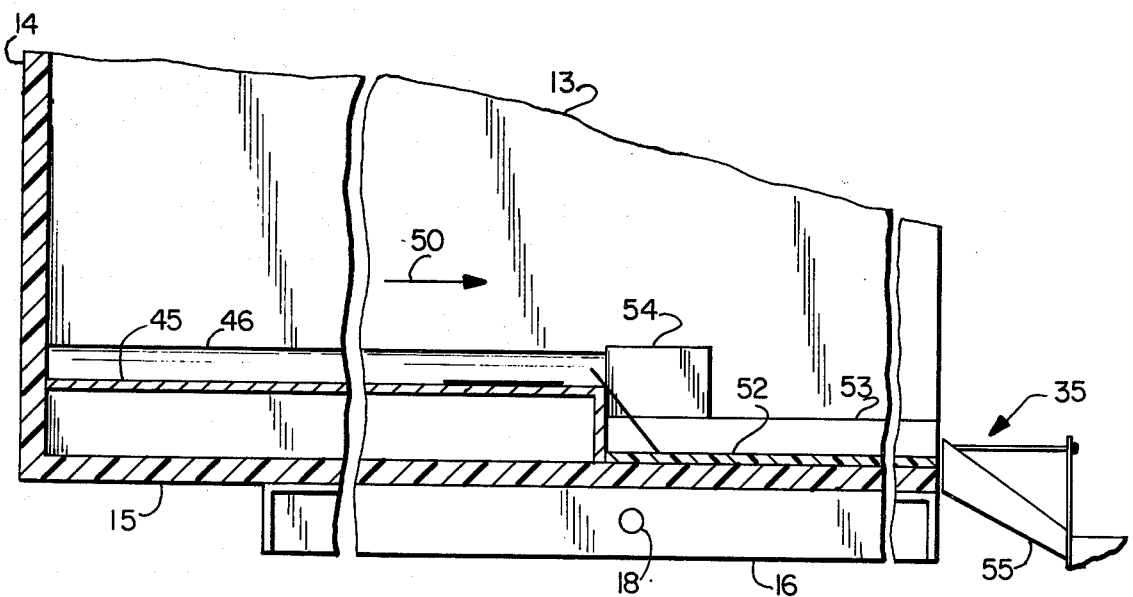
FIG. 3 is a foreshortened side elevation, in partial section, along lines 3—3 of FIG. 2.
Figure 5:
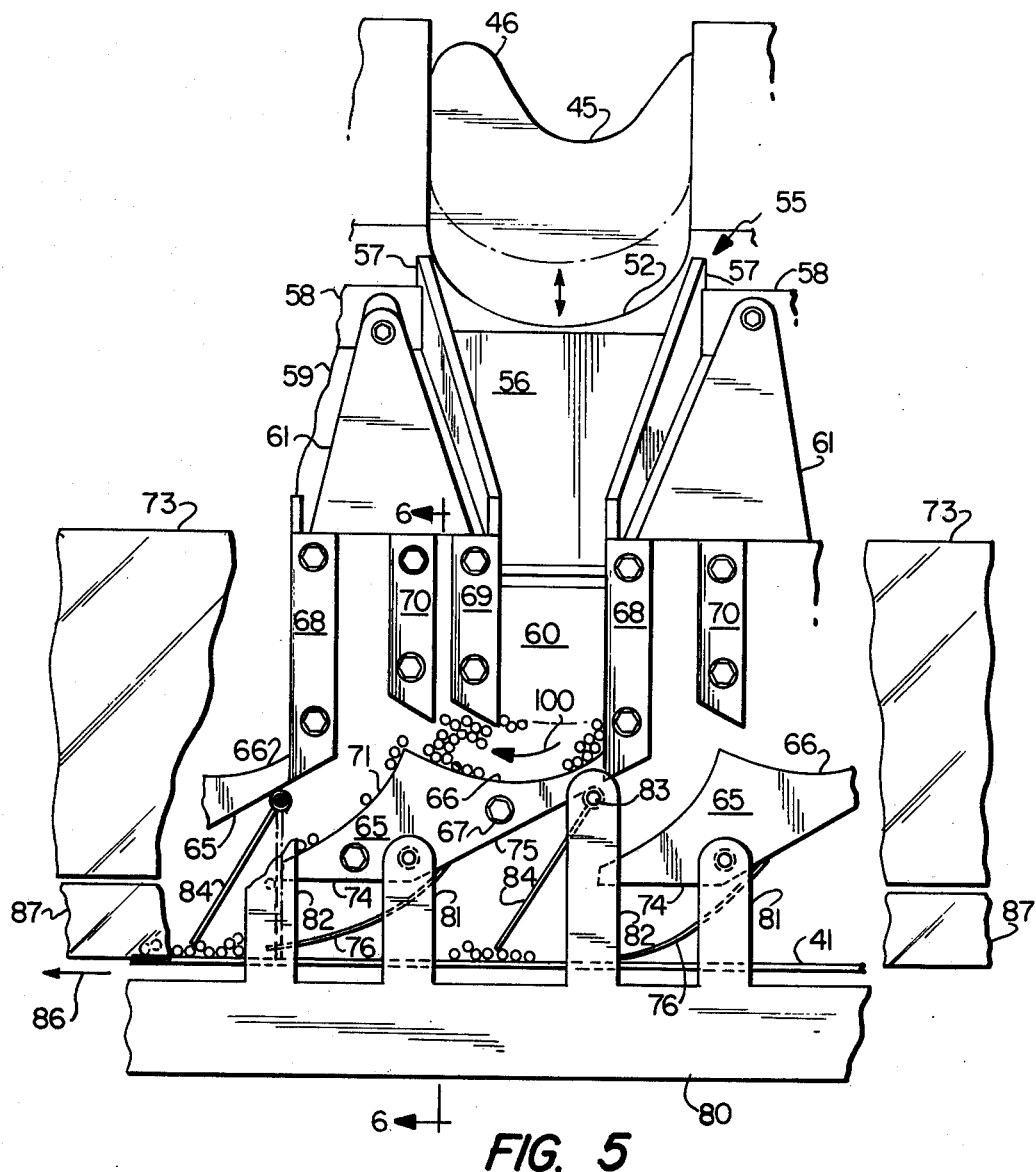
FIG. 5 is an enlarged partial front elevation of the apparatus of FIGS. 1–3.

Chute assemblies 35 include a plurality of chutes 55, the number of chutes being equal to the number of channels 52. Each chute includes, as best seen in FIG. 5, a downwardly sloping surface 56 which is triangular in shape, the upper inlet end thereof being slightly wider than the width of a channel 52 and the lower end thereof being somewhat narrower. Upstanding side walls 57 converge and confine the sticks to surface 56. The chutes are joined to each other by vertical wall portions 58 and downwardly sloping wall portions 59 which are joined to walls 57, the chutes being joined to each other in this fashion in sets of three in the example shown. A continuous wall structure 60 extends along the entire outlet end of the chute structures, wall 60 having upstanding generally triangular portions 61 from which threaded support rods 62 extend rearwardly, the rods passing through aligned openings in members 61 and walls 58. These rods can be made in the form of bolts with an enlarged head at one end and a threaded opposite end to receive a nut, thereby holding the chute assemblies to the supporting wall 60 which, in turn, is mounted on the vibrating hopper structure 36. Thus, the chute vibrates with the hopper structure and, as seen in FIG. 3, there is a space between the outlet end of the tray structure and the inlet ends of the chutes to permit relative horizontal movement therebetween.

The hopper structure includes a plurality of substantially identical hoppers each associated with one of the chutes and each including a bottom block 65 which has an upwardly facing concave upper surface 66 onto which the sticks fall from chute surface 56. Each block 65 is fixedly attached to mounting plate 60 as by bolts 67. A vertical side wall 68 extends upwardly from one side of block 65 to a point above the outlet end of chute 56 and is also bolted to plate 60. At the other side of the hopper opening are two substantially identical walls 69 and 70, also attached to plate 60, wall 69 serving as one side wall of the hopper and having a lower sloping surface which forms a control edge to control the outflow of sticks from the hopper. Wall 70 also has an identical lower sloping surface which further serves a control function. It will be observed that the lower edges of walls 69 and 70 are spaced upwardly from the concave upper surface of block 65, thereby defining an exit opening through which sticks can pass, in a direction perpendicular to their lengths, the outlet side of block 65 having a downwardly sloping and curved exit surface 71 down which sticks can roll. A barrier plate 73, which is conveniently made of a transparent plastic material of relatively rigid construction, such as plexiglas or glass, to keep the sticks from emerging lengthwise from the end of the hopper. While plate 73 need not be transparent, it is convenient to make it so in order to permit observation of the progress of sticks through the hopper assembly. It will be observed that each of blocks 65 has a lower substantially horizontal surface 74, and that the lower edge of plate 73 terminates at approximately the same plane as that containing surfaces 74. It will also be observed that blocks 65 have upwardly sloping lower surfaces 75, extending from surface 74 to wall 68, the angle thereof being sufficient to clear the next adjacent hopper outlet, but this angle being otherwise not critical. Leaf members 76 of relatively thin and flexible, resilient material extend downwardly and laterally from surfaces 75.

Figure 6:
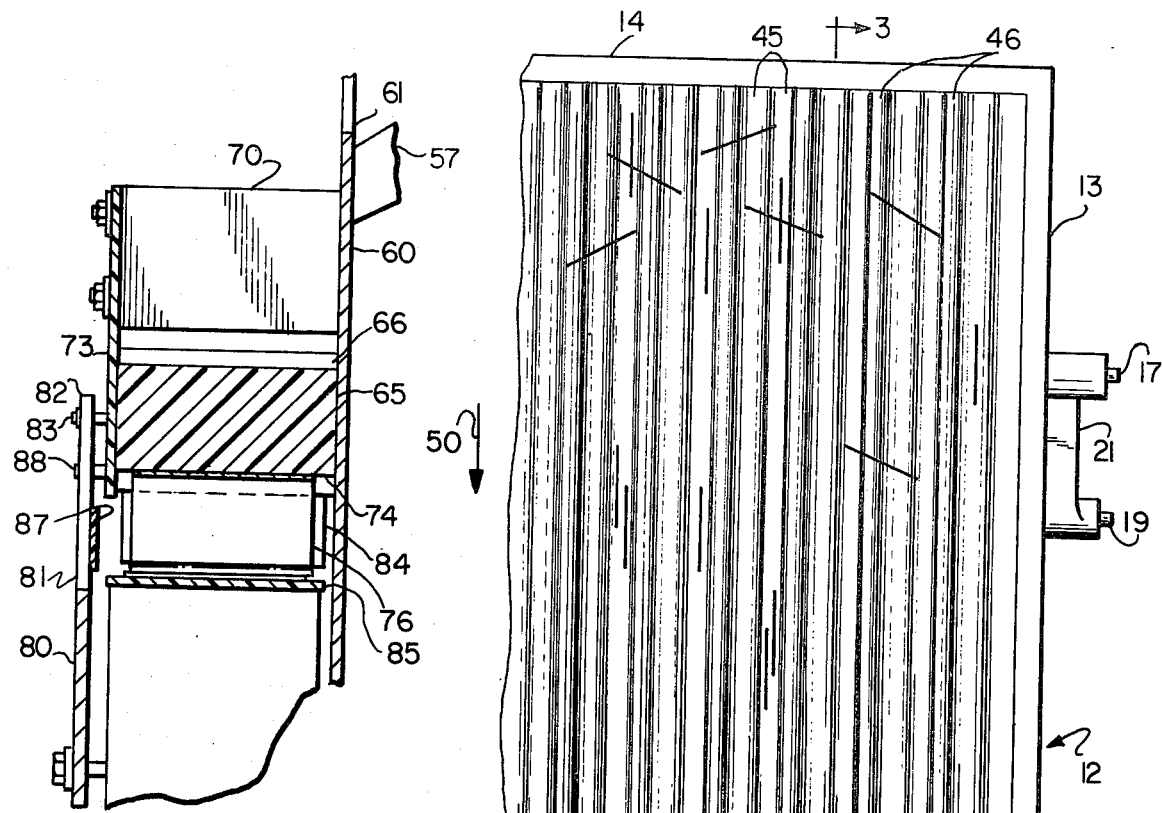
FIG. 6 is a partial side elevation, in partial section, along lines 6—6 of FIG. 5.

The apparatus including the chutes and hoppers thus far described are all mounted on, or associated with, the vibratory portion of the hopper apparatus, including plate 73 which is bolted onto the front surfaces of blocks 68, 69 and 70 and all of this vibratory structure is supported on springs 38. Below and in front of this vibrating structure is a fixed structure which is mounted on frame 39 and which does not vibrate. This includes a front plate 80 which extends across the entire front, and below, the hopper structure and includes a plurality of upwardly extending fingers 81 and 82, fingers 82 being taller than fingers 81, and the fingers being alternated. Near the upper end of fingers 82, a rod 83 extends rearwardly beneath block 65 and through plate 60 to a similar mounting member at the rear of the structure. A swinging gate 84, which is generally rectangular in shape and relatively thin, is formed with a journal portion at the upper end thereof, surrounding rod 83 so that the gate can swing freely between a position wherein it is adjacent the lower end of surface 71 and a position in which it is angled away from the lower end thereof. This gate 84 is normally held, by gravity, against or near the lower end of surface 71 and acts as a valve to permit dispensing of sticks from the lower end of surface 71. However, the vibratory movement of the hopper structure and the movement of sticks can cause the gates to swing away from the ends of blocks 65. Below gates 84 is conveyor belt 41 which is a conventional belt moving in the direction of arrow 86 to receive sticks from the hoppers and convey them to a receiving location. As also seen in FIG. 6, a lower front plate 87 is mounted on the non-vibratory portion of the apparatus parallel with and below plate 73, there being a space between the two plates to permit relative motion during the vibration.

Rods 88 extend from near the upper ends of figures 81 through blocks 65, the blocks having enlarged bores therethrough to permit movement of the blocks relative to the rods, without contact.

Referring again to FIG. 2, it will be seen that conveyor belt 41 extends laterally somewhat beyond the hopper structure, carrying aligned sticks in a single layer to a receiving location at an end roller 90 around which the belt passes. Roller 90 is suitably journaled in bearing members 91 and 92, in conventional fashion, which are supported on frame 39. Similarly, at the other end the belt passes around a roller 94 which is rotatably mounted in bearings 95 and 96. The mounting shaft of roller 90 can be attached to a sprocket 97 which is coupled to a similar sprocket on a drive motor, not shown, by a chain 98, also in conventional fashion.

While it is believed that the advantages and operation of the apparatus will be apparent from the foregoing, following is a brief summary of its overall operation. A supply of sticks in random orientation is delivered to the closed input end of the tray at 47 while the tray is being reciprocated or oscillated by the drive mechanism. As shown in FIGS. 2 and 3, the tray structure can be molded or otherwise formed using plastic materials which are relatively light in weight and can be formed as a largely hollow shell. Thus, the mass which must be reciprocated is relatively small and requires minimal energy. The sticks are bounced and jiggled on the upper surface of the upper, rear tray section, causing them to quickly be aligned and dropped into channels 45 and conveyed rapidly and continuously toward the open end of the tray structure. The number of channels is then reduced by half by feeding the sticks into channels 52 from pairs of channels 45, guided by blocks 54 and the funnel-like curved input portions of channels 52. The relatively narrow and close spacing of channels 45 in the upper portion promotes rapid orientation of the sticks and the reduction in the number of channels in the lower portion reduces the number of hoppers required.

The sticks are then fed out of the open ends of channels 52 into the chutes 55 in a nearly continuous stream and into hoppers 36, the chutes and hoppers being vibrated to maintain stick motion. As best seen in FIG. 5, the sticks form a stack in each hopper and move in a generally arcuate path, as indicated by arrow 100, toward the exit opening formed between surface 66 and the lower edges of blocks 69 and 70, those edges performing a "skimming" function which permits a stack of sticks one to three sticks deep to reach the line of intersection between surfaces 66 and 71, at which time the vertical layer of sticks at that intersection fall over the edge, pushed by the sticks still resting on surfaces 66. They are then permitted to fall onto the conveyor belt 41 moving to the left (in FIGS. 2 and 5). Gates 84 and leaf members 76 retard and spread the sticks along the belt so that they emerge beyond the outlet (left) end of the hopper structure in generally a single layer.

The motion of the stacked sticks in the hoppers is particularly interesting. Because of the fact that concave surface 66 extends laterally beyond wall 69, sticks are delivered to and stacked on top of each other toward the side of that surface closest to the inwardly facing surface of wall 68. Thus, the stick stack is higher, and therefore heavier, at the side closest to wall 68. The continuous rapid vibratory movement imparted to the hopper assembly and the assymetrical weight distribution in the hopper therefore causes the sticks to behave in a manner analogous to free-flowing particulate material so that the sticks present the appearance of flowing in the direction of arrow 100. The result of this smooth flowing motion is that the sticks do not lose their parallel alignment passing from the hoppers to the conveyor belt.

It will also be observed that the isolation of the vibrating chutes and hoppers from the conveyor belt and associated apparatus minimizes the mass which must be vibrated and greatly enhances the efficiency of the system.

Figure 7:
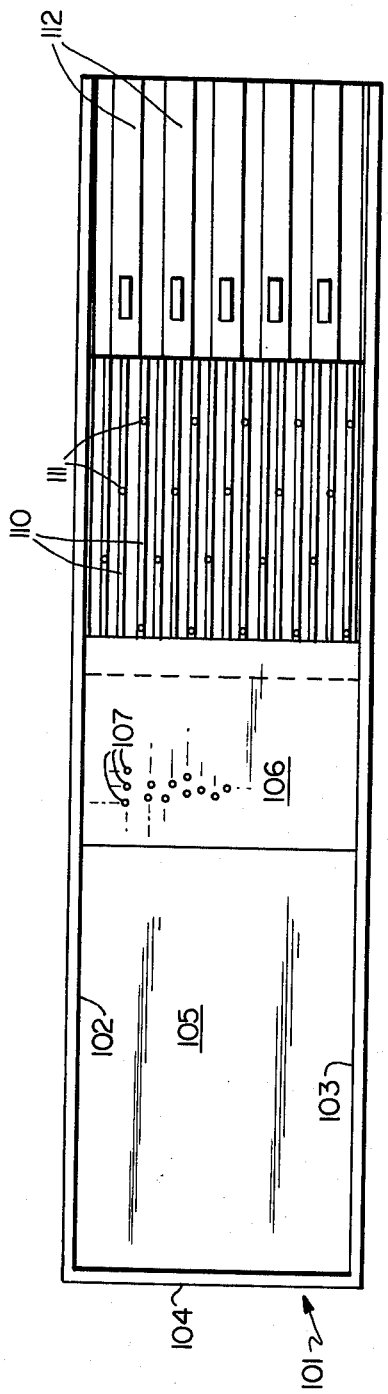
FIG. 7 is a plan view of a second embodiment of a tray structure in accordance with the invention.
Figure 9:
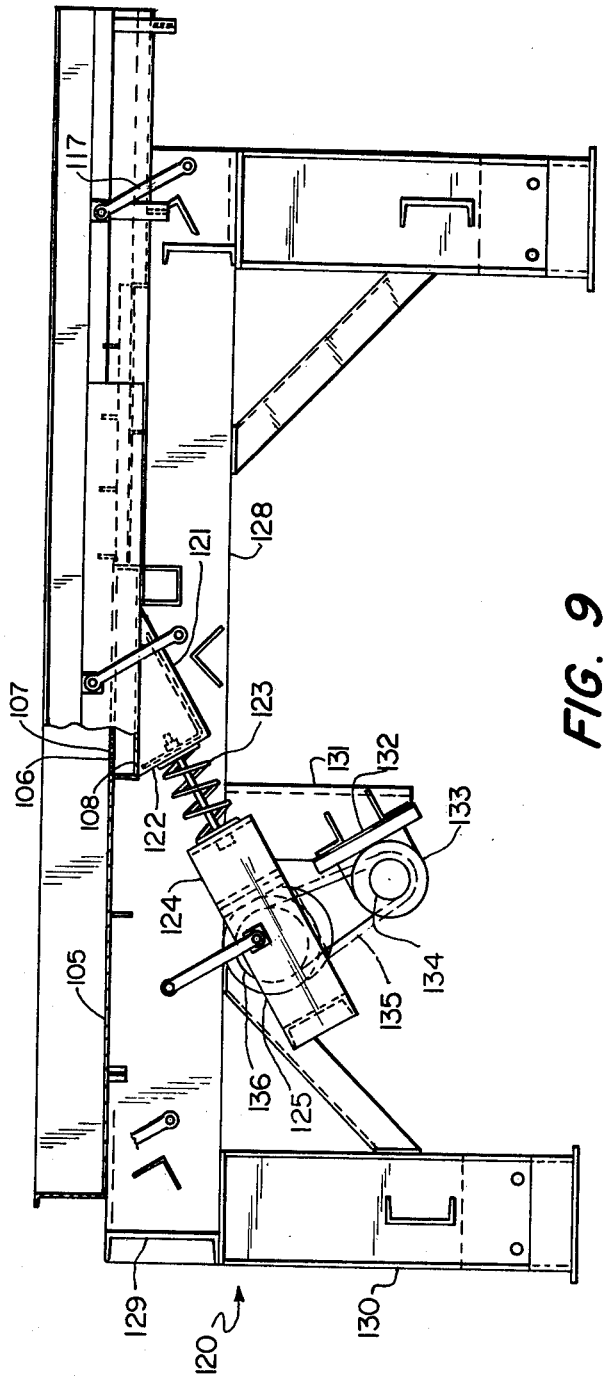
FIG. 9 is a partial side elevation of a further embodiment of an apparatus in accordance with the invention.
Figure 8:
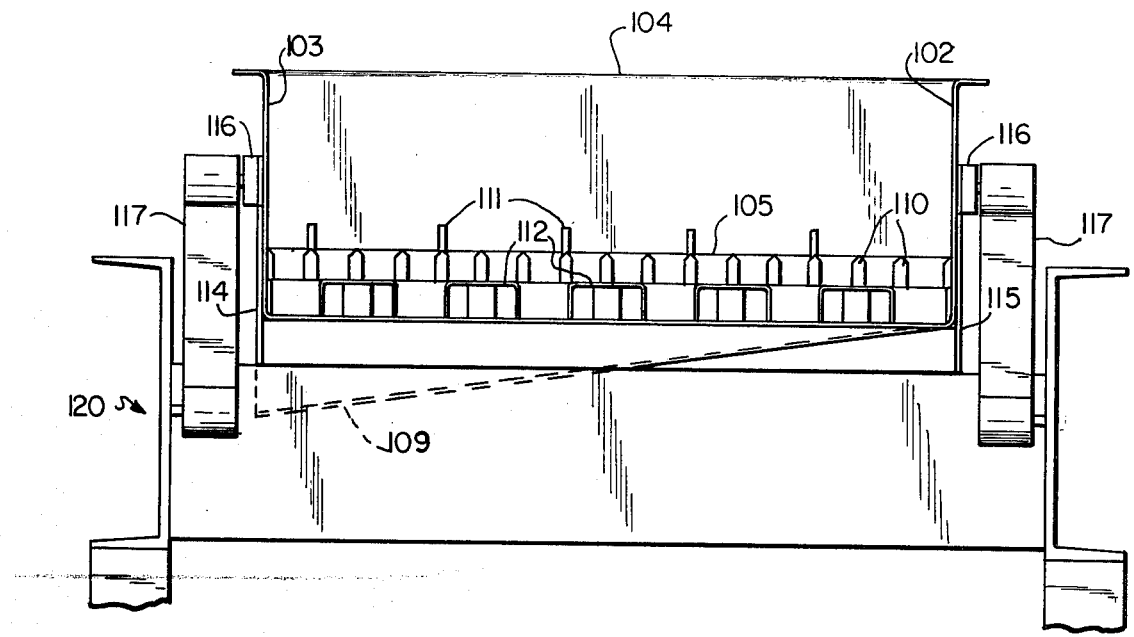
FIG. 8 is an end elevation of the tray structure of FIG. 7.

A further embodiment of a tray structure in accordance with the invention is shown in FIGS. 7-9, this embodiment being particularly suitable for fabrication using primarily sheet metal. The tray structure indicated generally at 101 includes upstanding side walls 102 and 103 and an end wall 104 as in the embodiment of FIGS. 1-6, except that the walls are relatively thin material with outwardly extending flanges at the tops thereof. At the end of the tray closest to end wall 104 is a flat, smooth floor section 105 which can be attached to the side walls as by welding. Articles to be sorted and aligned are received on this floor section, and are caused to move in a direction away from end wall 104 by the reciprocatory action of the tray.

Adjacent floor 105 is a further floor section 106 which, as seen in FIG. 9, is attached between the side walls at the same level as floor 105. Floor section 106 differs from section 105 in being provided with a plurality of perforations 107 in its surface. For the purpose of conveying and aligning four-inch sticks, the tray will typically be approximately two feet in width, between walls 102 and 103, and floor section 106 can be on the order of 18 inches long. In such case, the perforations therein can be ½-inch diameter holes on 11/16-inch staggered centers. This permits fragments of cut stick material and the like to be removed from the mass of sticks passing across this portion of the apparatus, thereby preventing small fragments and the like from interfering with the operation of the apparatus in any way. A tray structure 108 is provided below floor 106 to catch any such fragments, and a sloping chute 109 at the forward end of this tray structure can deliver the fragments laterally to be received by a waste can disposed beneath the machine.

Immediately downstream of floor 106 is a first alignment portion of the apparatus including a transverse floor supporting a plurality of upstanding longitudinally extending divider wall members 110, the upper portions of which are beveled to approach a rather narrow upper edge. Typically, these walls are approximately one-inch in height and ½-inch in width, and are spaced apart to define one-inch wide channels therebetween. As will be observed particularly in FIGS. 7 and 8, each one of walls 110 is provided with at least one upwardly extending pin 111 which can extend above the barrier by approximately one-inch, pins of ¼-inch diameter being suitable for this purpose. It is particularly significant to note that the pins are arranged in staggered fashion, the pin or pins in one barrier being longitudinally offset by, for example, about six inches, from the pins in the adjacent barriers. The purpose of these pins is to prevent a stick from lying perpendicular to walls 110 and rolling along the upper edges of these walls to the outlet end of the channels defined therebetween. The pins stop any such rolling sticks and permit them to be rotated until they fall between the separating walls, thereby guaranteeing that all sticks in this region are aligned in generally parallel relationship with each other in the channels.

Finally, at the end of the tray structure farthest from end wall 104 is a portion of the tray including a plurality of elongated rectangular dividers 112 which are significantly wider than walls 110, dividers 112 being also fewer in number to define a relatively small number of wider channels into which the sticks from the channels between walls 110 can flow. The smaller number of channels between dividers 112 is equal in number to the hopper structures, as discussed in connection with FIGS. 1–6, the same hopper structures being usable with this tray structure and, therefore, not being shown in FIGS. 7–10.

Side plates 114 and 115 are attached to the outer surfaces of walls 103 and 102, respectively, and carry bosses 116 which, as seen in FIG. 8, receive shafts which are pivotally connected to links 117 which perform substantially the same function as links 21 and 22 discussed in connection with FIG. 1, the other ends of these links being pivotally connected to the main frame indicated generally at 120 which supports the tray structure. If desired, additional guide members can be mounted on members 112 to guarantee that no sticks will come to rest on the upper surfaces thereof.

As best seen in FIG. 9, the tray structure is supported by a plurality of links 117, three pairs thereof being shown, for reciprocatory movement relative to frame 120. Extending downwardly from the lower portion of the tray structure is a relatively thick and rigid angle member 121 which is rigidly attached to the tray structure, a sloping surface 122 of the angle member abutting one end of one or more coil springs 123, the other ends of which are attached to a box-shaped metal frame member 124. Frame member 124 is attached to a vibrating shaker assembly 125, the shaker assembly being mounted within the box-like frame structure which is movable relative to frame 120 and which is attached to angle member 121 by central bolts extending through the center of coil spring 123. In a practical embodiment thereof, this assembly can include a pair of springs 123 laterally spaced apart.

Frames 120 itself includes longitudinal side members 128 and end members 129, all of rigid channel construction, with legs 130 supporting the rectangular frame portion above a floor. Suitable bracing members, which will not be described in detail, can also be supplied to render the frame structure rigid and sufficiently strong to support the moving elements. A pair of downwardly extending channel members 131 supports a transversely extending plate 132 on which is mounted an electrical motor 133, members 131, 132 and 133 being fixedly attached to the frame structure and not movable relative thereto. The output shaft of motor 133 carries a pulley 134 and a belt 135 extends between pulley 134 and a pulley 136 on the input shaft of the vibrating shaker. Thus, rotation of the motor causes the shaker structure to rotate, thereby inducing reciprocatory motion in the box frame structure 124 and, through the coupling of coil springs 123, causes the tray assembly 101 to also vibrate.

A vibrating shaker assembly which is suitable for this purpose is commercially obtainable from the Ajax Flexible Coupling Company, Inc., of Westfield, New York, and includes a totally enclosed splash-lubricated structure containing two weights which are mounted on shafts geared together and supported by suitable heavy-duty bearings. The two weights rotate in opposite directions, producing a straight line motion which is transferred to the box frame and the tray, causing a lifting and throwing of articles contained within the tray which, as described, is supported by the pivotal links. The advantage of this apparatus is that the amplitude of movement of the entire tray structure is smaller and more rapid than with the structure described in connection with FIGS. 1–6, the amplitude of movement being in the order of 3/16-inch to ¼-inch (0.05–0.064 cm). The advantage of this reduced amplitude is that it permits a significant decrease, by a factor of two or more, in the gap between the output end of the tray structure and the input end of the hopper assembly, thereby reducing the possibility that an operator might inadvertently catch a finger in this space. Thus, the structure is not only efficient but somewhat safer.

As an alternative, an electromagnetic vibratory feeder such as the Model 5-330 feeder manufactured by FMC Corporation, Material Handling Equipment Division, Homer City, Pennsylvania, can be substituted for the vibrating shaker described above. While the electromagnetic feeder is a more expensive alternative, it is suitable for this purpose and can be employed if desired.

Figure 10:
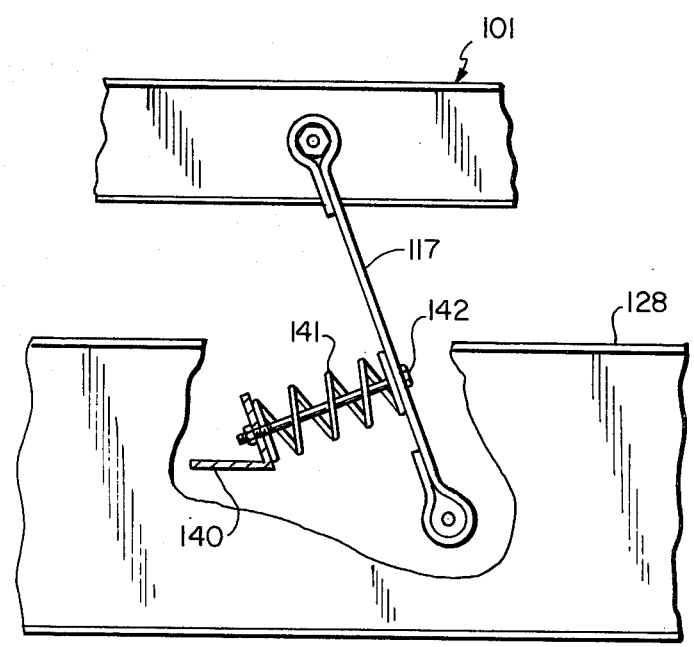
FIG. 10 is a partial view of a portion of the suspension structure usable in the apparatus of FIG. 9.

A further detail of the suspending link structure is shown in FIG. 10 wherein a fragment of the tray 101 is shown mounted above a side rail 128 of frame structure 120 with a link 117 extending between the tray and the frame. In this embodiment, a relatively rigid transverse frame member 140 extends between side rails 128 and is rigidly attached thereto. One surface of angle member 140 is approximately parallel with link 117 and a coil spring 141 extends between the link and the angle member, the spring being maintained in position and the link being limited in its motion by a bolt 142 extending through the link, the angle member and the central axis of the coil spring. This structure, which can be provided on all of the suspending links, or on selected ones thereof, is referred to as a spring-loaded arm. The ends of the link can include elastomer torsion bushings which eliminate bearings and lubrication problems, and the springs resist excessive motion of the tray, permitting a rapid and short stroke vibratory action which is particularly suitable for providing the necessary reciprocatory action of the tray structure of the present invention.

While certain advantageous embodiments have been chosen to illustrate the invention, it will be understood by those skilled in the art that various changes and modifications can be made therein without departing from the scope of the appended claims.

What is claimed is:

1. An apparatus for receiving a large number of randomly oriented elongated articles and for aligning and delivering said articles to a receiving location comprising the combination of:

(a) an aligning tray for receiving said randomly oriented articles on the upper surface thereof, said surface having means defining a plurality of parallel elongated channels, each of said channels being open at one end and closed at the other end, said tray including a first portion wherein said means defining said channels comprises a convoluted surface forming, in cross section, channels having generally rounded bottom surfaces and generally rounded walls between said channels, and a second portion wherein said means defining said channels defines a plurality of spaced-apart channels each having generally rounded bottom surfaces lower than said rounded bottom surfaces formed by said convoluted surface and a plurality of separators between said spaced apart channels, with the number of channels in said second portion being smaller than the number of channels in said first portion;

(b) means for supporting and repetitively reciprocating said tray in a direction having a component of movement in the longitudinal direction of said channels to cause said articles to enter said channels and move lengthwise toward and out of said open ends;

(c) a plurality of hopper means for receiving articles from said tray, each of said hopper means including an upwardly opening compartment having side walls and a bottom wall, one of said side walls having means defining an exit opening through which articles can pass in a direction perpendicular to their lengths; said hopper means further including a plurality of chutes, equal in number to the number of channels in said second portion of the tray, said chutes being mounted for vibratory movement with said compartments and extending downwardly between said open ends of said channels in said second portion of the tray and said compartments, with the number of said compartments also being equal to the number of channels in said second portion of the tray;

(d) means for supporting said hopper means adjacent to and below said open ends independently of said tray to receive aligned articles emerging from said open ends, said means for supporting including means for vertically vibrating said hopper means; and (e) belt conveyor means movable below said hopper means to receive said articles and to convey said articles in their aligned arrangement perpendicular to the direction of their lengths to said receiving location.

2. An apparatus according to claim 1 wherein each of said hopper means includes
   an inclined surface extending downwardly from said exit opening to a position above said belt conveyor means.

3. An apparatus according to claim 2 and further comprising
   a gate extending across the lower end of each of said inclined surfaces, and
   means for supporting each said gate for swinging pivotal movement about a horizontal axis perpendicular to the direction of movement of said belt conveyor means to control the flow of articles from said inclined surface to said conveyor means, said means for supporting said gates being independent of said means for vibrating said hopper means.

4. An apparatus according to claim 3 wherein said hopper means further comprises
   a plurality of flexible members extending downwardly and laterally in the direction of movement of said conveyor means for spreading articles deposited on said conveyor means.

5. An apparatus according to claim 1 wherein said means defining said channels in said second portion of the aligning tray defines one-half as many channels as in said first portion of said tray; and means for guiding articles from each pair of said channels in said first portion of the tray into one channel in said second portion of the tray.

6. An apparatus according to claim 1 wherein the bottom wall of each compartment has parallel side edges and an upwardly facing concave cylindrical surface, the center of curvature of said surface being parallel to the direction of the lengths of said articles when aligned; and wherein the side walls of each compartment include a first side wall extending upwardly from one side edge of said concave cylindrical surface, and a second side wall parallel to and spaced from said first side wall, said second side wall terminating in a bottom edge spaced upwardly from said concave cylindrical surface and inwardly of the other side edge thereof, said bottom edge and said concave cylindrical surface defining said exit opening, with each compartment further including end wall means perpendicular to said first and second side walls for preventing longitudinal movement of said articles out of said compartment.

7. An apparatus according to claim 6 wherein each of said compartments further comprises a third side wall spaced from said second side wall between said second wall and said other side edge of said concave cylindrical surface, said third side wall terminating in an edge spaced upwardly from said concave cylindrical surface.

8. An apparatus according to claim 1 wherein said means for vibrating includes
   an electromagnetically driven vibrator attached to said hopper means for vibrating said hopper means at a rate of about 3,600 cycles per minute at an amplitude of between about 1.0 and 1.3 mm.,
   and said means for supporting further includes
   a fixed frame; and a plurality of springs mounted on said frame, said hopper means being supported on said springs for vibratory movement independently of said frame.

9. An apparatus according to claim 1 wherein said belt conveyor means includes an endless belt;
a plurality of rollers for supporting and guiding said belt; and
bearing means for rotatably supporting said rollers on said frame.

* * * * *